US011108683B2

(12) United States Patent
Brissette et al.

(10) Patent No.: US 11,108,683 B2
(45) Date of Patent: *Aug. 31, 2021

(54) TECHNIQUES FOR PREFERRED PATH LOCAL SWITCHING IN EVPN-VPWS

(71) Applicant: Cisco Technology, Inc., San Jose, CA (US)

(72) Inventors: Patrice Brissette, Ontario (CA); Ali Sajassi, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,211

(22) Filed: Aug. 5, 2019

(65) Prior Publication Data
US 2019/0356581 A1 Nov. 21, 2019

Related U.S. Application Data

(63) Continuation of application No. 15/619,301, filed on Jun. 9, 2017, now Pat. No. 10,454,814.

(51) Int. Cl.
*H04L 12/703* (2013.01)
*H04L 12/715* (2013.01)
(Continued)

(52) U.S. Cl.
CPC ............ *H04L 45/28* (2013.01); *H04L 12/413* (2013.01); *H04L 12/4641* (2013.01); *H04L 45/04* (2013.01); *H04L 45/22* (2013.01)

(58) Field of Classification Search
CPC ............... H04L 12/413; H04L 12/4641; H04L 12/5601; H04L 12/721; H04L 29/06163;
(Continued)

(56) References Cited

U.S. PATENT DOCUMENTS 7,643,409 B2 1/2010 Voit et al.
8,175,078 B2 * 5/2012 Voit ...................... H04L 12/462
370/351
(Continued)

OTHER PUBLICATIONS

Aggarwal, R., et al., "BGP MPLS Based Ethernet VPN," Network Working Group, Internet-Draft, Standard Track, Feb. 24, 2012, 39 pages.
(Continued)

*Primary Examiner* — Frank Duong

(57) ABSTRACT

In one embodiment, a method includes, subsequent to receipt of a packet from a first customer network node destined for a second customer network node at a first provider network node, determining whether a local connection exists between the first provider network node and the second customer network node, the provider network node forming part of an Ethernet Virtual Private Network ("EVPN")—Virtual Private Wire Service ("VPWS") domain; if a local connection is determined to exist between the first provider network node and the second customer network node, determining whether the local connection has failed; if the local connection is determined not to have failed, switching the packet to the second customer network node via the local connection instead of via the EVPN-VPWS domain; and if the local connection is determined to have failed, switching the packet to the second customer network node via the EVPN-VPWS domain.

20 Claims, 4 Drawing Sheets

(51) Int. Cl.
  *H04L 12/46* (2006.01)
  *H04L 12/707* (2013.01)
  *H04L 12/413* (2006.01)
(58) Field of Classification Search
  CPC ......... H04L 43/50; H04L 45/02; H04L 45/04;
        H04L 45/14; H04L 45/22; H04L 45/26;
           H04L 45/28; H04L 45/50; H04L
               2012/5665; G06F 15/173
  See application file for complete search history.

(56) References Cited

U.S. PATENT DOCUMENTS

| | | | |
|---|---|---|---|
| 8,948,055 B2 * | 2/2015 | Bragg | H04L 12/462 370/255 |
| 9,049,133 B2 | 6/2015 | Boutros et al. | |
| 9,858,150 B2 | 1/2018 | Sajassi et al. | |
| 9,923,781 B2 | 3/2018 | Chalapathy et al. | |
| 9,985,838 B2 | 5/2018 | Lin et al. | |
| 2005/0190757 A1 | 9/2005 | Sajassi | |
| 2010/0040368 A1 | 2/2010 | Kotrla et al. | |
| 2011/0116443 A1 | 5/2011 | Yu et al. | |
| 2012/0201124 A1 | 8/2012 | Marques et al. | |
| 2012/0213222 A1 | 8/2012 | Filsfils et al. | |
| 2013/0148657 A1 | 6/2013 | Salam et al. | |
| 2013/0235876 A1 | 9/2013 | Sajassi et al. | |
| 2016/0065450 A1 | 3/2016 | McAllister et al. | |

OTHER PUBLICATIONS

Rosen, E., et al., "BGP/MPLS IP Virtual Private Networks (VPNs)," Network Working Group, RFC 4364, Feb. 2006, 47 pages; https://tools.ietf.org/pdf/rfc4364.pdf.

Martini, L., et al., "Encapsulation Methods for Transport of Ethernet over M PLS Networks," Network Working Group, RFC 4448, Apr. 2006, 24 pages; https://www.rfc-editor.org/rfc/pdfrfc/rfc4448.txt.pdf.

Martini, L., et al., "Dynamic Placement of Multi-Segment Pseudowires," Internet Engineering Task Force (IETF), RFC 7267, Jun. 2014, 24 pages; https://www.rfc-editor.org/rfc/pdfrfc/rfc7267.txt.pdf.

Sajassi, A., et al., "BGP MPLS-Based Ethernet VPN," Internet Engineering Task Force (IETF), RFC 7432, Feb. 2015, 56 pages; https://www.rfc-editor.org/rfc/pdfrfc/rfc7432.txt.pdf.

Boutros, S., et al., "Virtual Private Wire Service Support in Ethernet VPN," Internet-Draft, Standard Track, May 14, 2017, 15 pages.

Boutros et al., "VPWS Support in EVPN", Internet Draft, Jun. 7, 2016, 14 pages.

A. Sajassi, et al., "EVPN VPWS Flexible Cross-Connect Service", draft-sajassi-bess-evpn-vpws-fxc-01.txt, BESS Workgroup, Internet-Draft, Nov. 1, 2016, 13 pages.

S. Boutros, et al., "VPWS support in EVPN", draft-ietf-bess-evpn-vpws-07.txt, Internet-Draft, Jul. 5, 2016, 13 pages.

* cited by examiner

TECHNIQUES FOR PREFERRED PATH LOCAL SWITCHING IN EVPN-VPWS

CROSS-REFERENCE TO RELATED APPLICATION

This application is a continuation of and claims benefit to U.S. patent application Ser. No. 15/619,301, filed on Jun. 9, 2017, and issued on Oct. 22, 2019 as U.S. Pat. No. 10,454,814, the entire contents of which are incorporated herein by reference.

TECHNICAL FIELD

This disclosure relates in general to the field of computer networking and, more particularly, to techniques for performing preferred path local switching in Ethernet Virtual Private Network ("EVPN")—Virtual Private Wire Service ("VPWS").

BACKGROUND

As described in Internet Engineering Task Force ("IETF") Internet Draft entitled "Virtual Private Wire Service support in Ethernet VPN," (hereinafter "IETF EVPN-VPWS Draft"), an Ethernet Private Line ("EPL") and/or Ethernet Virtual Private Line ("EVPL") may be overlayed on an Internet Protocol/Multi Path Label Switching ("IP/MPLS") core network. IETF EVPN-VPWS Draft further describes how forwarding is constructed and how various service instance IDs may be connected. In particular, in a VPWS service, the traffic from an originating Ethernet Segment ("ES") may be forwarded to a single destination ES; therefore, no MAC lookup is needed and an MPLS label associated with a per-EVPN instance ("EVI") Ethernet auto-discovery ("A-D") route may be used in forwarding user traffic to the destination attachment circuit ("AC").

The IETF EVPN-VPWS Draft fails to address how to implement preferred path local switching in the context of EVPN-VPWS. By default, EVPN-VPWS attempts to establish a circuit across the EVPN-VPWS domain in every case; local knowledge of other EVPN-VPWS configured circuits is not considered during circuit establishment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in one embodiment includes, subsequent to receipt of a packet from a first customer network node destined for a second customer network node at a first provider network node, determining whether a local connection exists between the first provider network node and the second customer network node, the provider network node forming part of an Ethernet Virtual Private Network ("EVPN")—Virtual Private Wire Service ("VPWS") domain; if a local connection is determined to exist between the first provider network node and the second customer network node, determining whether the local connection has failed; if the local connection is determined not to have failed, switching the packet to the second customer network node via the local connection instead of via the EVPN-VPWS domain; and if the local connection is determined to have failed, switching the packet to the second customer network node via the EVPN-VPWS domain.

In certain embodiments, the method further includes, if a local connection is determined not to exist between the first provider network node and the second customer network node, switching the packet to the second customer network node via the EVPN-VPWS connection. In some embodiments, the first customer network node is locally connected to the first provider network node and the first and second customer network nodes comprise customer edge ("CE") nodes. In particular embodiments, the first and second provider network nodes comprise provider edge ("PE") nodes. The method may further include establishing a circuit between the first provider network node and a second provider network node via the EVPN-VPWS domain, in which case the second customer network node may be locally connected to the second provider network node.

Example Embodiments

Figure 1:
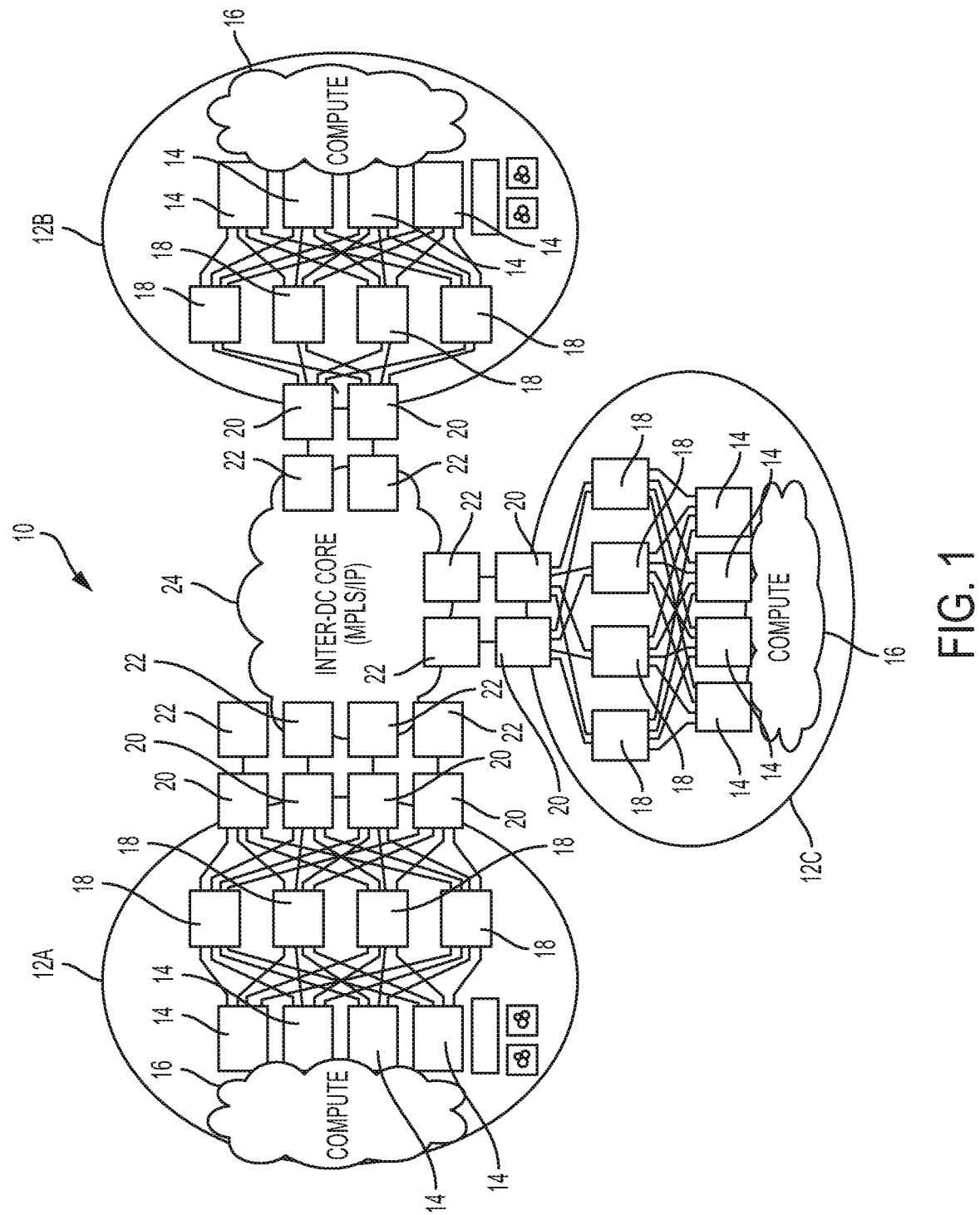
FIG. 1 is a simplified block diagram of a data communications environment including features of embodiments described herein for performing preferred path local switching in EVPN-VPWS.

Referring now to FIG. 1, illustrated therein is a simplified block diagram of an example communications system 10 in accordance with embodiments described herein. In the embodiment shown in FIG. 1, the system 10 comprises a plurality of Data Fabric Architecture ("DFA") fabrics, respectively designated by reference numerals 12A, 12B, and 12C. In one embodiment, the fabrics 12A-12C are geographically dispersed. For example, fabric 12A may be located in Washington, D.C., fabric 12B may be located in Mumbai, India, and fabric 12C may be located in Beijing, China. In other embodiments, one or more of the fabrics 12A-12C may be located in the same geographic area. Each of the fabrics 12A-12C comprises a plurality of leaf nodes 14, which in certain embodiments comprise network switching or routing elements. The leaf nodes 14 of each fabric 12A-12C connect to a respective compute network 16, each comprising a plurality of servers for hosting virtual machines ("VMs") or physical servers. Each of the leaf nodes 14 is connected to each of a plurality of spine nodes 18.

As previously noted, the leaf nodes 14 may be implemented as switching elements, such as Top of Rack ("ToR") switches, which may be located in a rack unit (not shown) that houses one or more network compute elements, such as physical servers, collectively represented in FIG. 1 by compute network 16. Each leaf node is connected to each of the spine nodes, which may be implemented using routers or switches, and is configured to route communications between the physical servers comprising the compute element in the rack unit and other network elements. Although not shown, it will be recognized that each of the physical servers of the compute network 16 may have instantiated thereon one or more virtual switches for hosting virtual machines ("VMs"). Virtual switches and VMs may be created and run on each physical server on top of a hypervisor installed on the server. Each virtual switch may be configured to manage communications of VMs, including, for example, virtual networks and/or subnetworks ("subnets"). Virtual switches may be embodied as software stored and executed on the corresponding physical server. Thus, the virtual switch performs functions of a physical switch device. Similarly, each VM may comprise software stored and executed on the corresponding physical server. The VMs are configured to exchange communications with other VMs via the system 10. It may be appreciated that any number of physical servers hosting any number of virtual switches and VMs may be present in the system 10. In addition, as previously noted, compute network 16 may include only bare blade/physical servers and may be devoid of VMs.

Referring again to leaf nodes 14, each leaf node is responsible for managing communications (e.g., routing and forwarding) originating from and destined for compute node to which it is connected. Leaf nodes 14 may be used to provide redundancy and fault-tolerance for communications associated with physical servers, virtual machines and virtual switches in the rack. As stated above, physical servers of the compute network 16 host VMs. VMs may exchange communications (e.g. data packets) with other VMs in the system 10 via leaf nodes. Each VM is a member of a tenant network, which is a unique L3 subnet that typically is represented by a VLAN. For example, a tenant "Company A" may have two tiers/tenant networks; namely 1.1.1.0/24 and 2.2.2.0/24 each represented by a different VLAN—e.g., 1.1.1.0/24 by VLAN-1 and 2.2.2.0/24 by VLAN-2. As the tenant network of which VM is a member, it may be provisioned with certain network attributes in order to exchange data packets. For example, upon instantiation, a tenant network and a VM therein may be provisioned with virtual network segmentation resources, for example the VM and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and VM therein are created, a ToR switch may select an unused VLAN for a given segmentation assignment. The virtual segmentation resources may also include a Switch Virtual Interface ("SVI") assignment, an Access Control List ("ACL") assignment, a Quality of Service ("QoS") assignment, a Virtual Routing and Forwarding ("VRF") assignment, etc. It may be appreciated that other network information now known or heretofore contemplated may also be assigned to the VM. Each tenant network is also associated with an Ethernet segment identifier ("ESI"), which is used to uniquely identify the tenant network in a particular leaf (e.g., ToR switch).

Referring again to FIG. 1, in accordance with features of embodiments described herein, each of the fabrics 12A-12C includes one or more border leaf ("BL") nodes 20, each of which is connected to a Data Center Interconnect ("DCI") node 22. Although the BL/DCI node combinations illustrated in FIG. 1 as comprising separate nodes 20 and 22, in some embodiments, the BL/DCI functionality may be integrated into a single device, or node. The DCI nodes 22 connect their respective fabrics 12A-12C to an inter-data-center core, which may be an MPLS/IP network, 24.

The use of EVPN mechanisms for VPWS ("EVPN-VPWS") brings the benefits of EVPN to Point-to-Point ("P2P") services. Such benefits may include single-active redundancy as well as all-active redundancy with flow-based load-balancing. As used herein, "single-active mode" refers to cases in which a device or a network is multi-homed to two or more PE nodes and only a single PE node in the redundancy group can forward traffic to/from the multi-homed device or network for a given VLAN. "All-active redundancy" refers to cases in which a device or a network is multi-homed to two or more PE nodes and all PE nodes in the redundancy group can forward traffic to/from the multi-homed device or network for a given VLAN.

BGP MPLS-Based Ethernet VPN (EVPN) enables customer traffic to be transmitted to/from a given customer Attachment Circuit ("AC"), without requiring Media Access Control ("MAC") lookup. This capability is ideal in providing P2P (or VPWS) services. In certain embodiments, EVPL service may be defined as a P2P service between a pair of ACs designated by VLANs. In an EPL service, all traffic flows are between a single pair of ports, which in EVPN terminology would constitute a single pair of Ethernet Segments ("ESes"). As used herein, an ES on a PE node refers to the link attached to it, which link may be one of a set of links attached to different PE nodes in multi-homed cases, or could be a single link in single-homed cases.

EVPL may be viewed as a VPWS with only two ACs. In delivering an EVPL service, the traffic forwarding capability of EVPN is based on the exchange of a pair of Ethernet Auto-Discovery ("AD") routes. For more general VPWS, traffic forwarding capability of EVPN is based on the exchange of a group of Ethernet AD routes, with one Ethernet AD route per AC/ES. In a VPWS service, the traffic from an originating ES may be forwarded to only a single destination ES; therefore, a MAC lookup is not needed and the MPLS label associated with the per EVPN instance ("EVI") Ethernet AD route can be used in forwarding user traffic to the destination AC.

For both EPL and EVPL services, a specific VPWS service instance may be identified by a pair of per-EVI Ethernet AD routes which together identify the VPWS service instance endpoints and the VPWS service instance. In the control plane, the VPWS service instance is identified using the VPWS service instance identifiers advertised by each Provider Edge ("PE") node. In the data plane, the value of the MPLS label advertised by one PE node is used by the other PE node to send traffic for that VPWS service instance. As with an Ethernet Tag in standard EVPN, the VPWS service instance identifier has uniqueness within an EVPN instance. A VPWS service instance is represented by a pair of EVPN service labels associated with a pair of endpoints.

Each label is downstream assigned and advertised by the disposition PE node through an Ethernet A-D per-EVI route. The downstream label identifies the endpoint on the disposition PE node. A VPWS service instance may be associated with only one VPWS service identifier.

In terms of route advertisement and MPLS label lookup behavior, EVPN-VPWS resembles VLAN-Based or VLAN-Bundle service of EVPN standard (RFC 7432) such that when a provider edge ("PE") node advertises per-EVI Ethernet AD route, the VPWS service instance serves as a 32-bit normalized Ethernet Tag ID. The value of the MPLS label in this route represents both the EVI and the VPWS service instance, so that upon receiving an MPLS encapsulated packet, the disposition PE can identify the egress AC from the MPLS label and subsequently perform any required tag translation. For EVPL service, the Ethernet frames transported over an MPLS/IP network should remain tagged with the originating VLAN-ID ("VID") and any VID translation must be performed at the disposition PE. For EPL service, the Ethernet frames are transported as is and the tags are not altered.

EVPN-VPWS may be differentiated from VPWS implemented using pseudowires ("PW") as follows. In EVPN-based VPWS, service endpoint discovery and label signaling are always performed concurrently using BGP. In contrast, with PW-based VPWS, label signaling may be performed using LDP and service endpoint discovery can be performed through either manual provisioning or BGP. Additionally, in existing implementations of VPWS using PWs, redundancy is limited to single-active mode, while EVPN implementation of VPWS supports both single-active and all-active redundancy modes. In existing implementations with PWs, backup PWs are not used to carry traffic; with EVPN, traffic can be load-balanced among different PE nodes multihomed to a single CE node. Upon link or node failure, EVPN can trigger failover with the withdrawal of a single BGP route per EVPL service or multiple EVPL services, whereas with PW, the failover sequence requires exchange of two control plane messages: one message to deactivate the group of primary PWs and a second message to activate the group of backup PWs associated with the access link. Finally, EVPN may employ data plane egress link protection mechanisms not available in VPWS. This may be accomplished by the primary PE node (on local AC down) using the label advertised in the per-EVI Ethernet A-D route by the backup PE node to encapsulate the traffic and direct it to the backup PE node.

Figure 2:
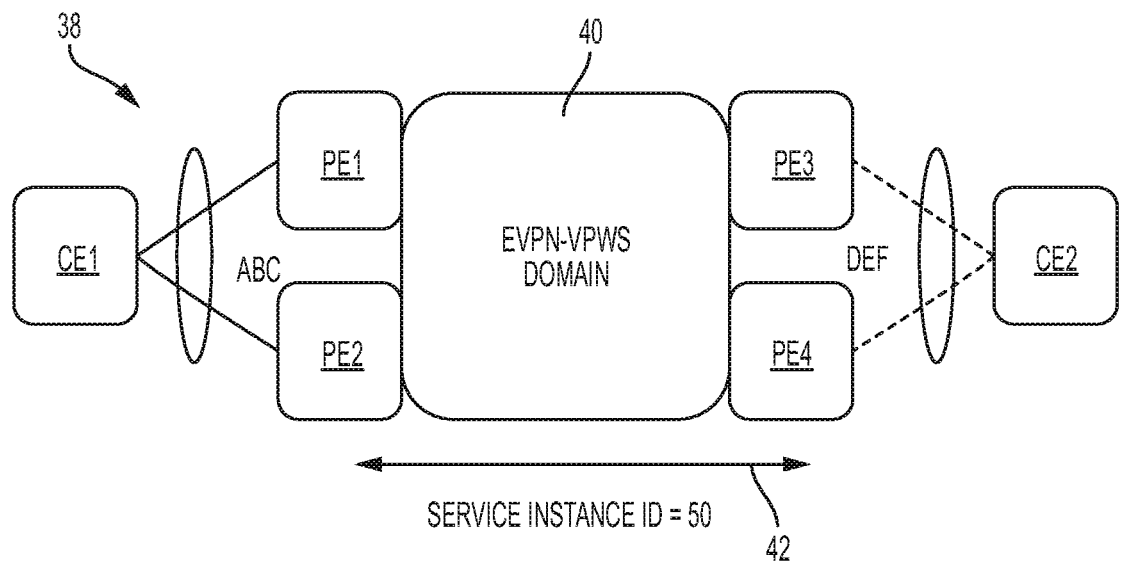
FIG. 2 is another simplified block diagram of a data communications environment including features of embodiments described herein for performing preferred path local switching in EVPN-VPWS.

FIG. 2 illustrates a simplified block diagram of a communications system 38 including features of embodiments described herein. The communications system 38 includes an EVPN-VPWS domain 40 with all-active connectivity on both sides. As shown in FIG. 2, the EVPN-VPWS domain 40 includes four PE nodes PE1-PE4. In one embodiment, a circuit is established between customer equipment ("CE") nodes CE1, CE2, via PE nodes PE1/PE2 and PE3/PE4. CE node CE1 is multihomed to PE nodes PE1 and PE2, which share an ESI of ABC. Similarly, CE node CE2 is multihomed to PE nodes PE3 and PE4 are peered, which share an ESI of DEF. As shown in FIG. 2, a VPWS service instance 42 across the EVPN-VPWS domain has a service instance ID of 50. For the circuit between CE nodes CE1 and CE2 through the EVPN-VPWS domain 40 to exist, the same service instance ID (i.e., service instance ID 50) must be configured on each side of the domain.

For a multi-homed CE node, such as CE nodes CE1 and CE2, the ESI field in an advertised per-EVI Ethernet A-D route is set to the CE node's ESI and the Ethernet Tag ID is set to the VPWS service instance identifier, which must have the same value on all PE nodes attached to that ES. This allows an ingress PE node in a multihoming all-active scenario, such as illustrated in FIG. 2, to perform flow-based load-balancing of traffic flows to all of the PE nodes attached to that ES. In all cases traffic follows the transport paths, which may be asymmetric. The VPWS service instance identifier encoded in the Ethernet Tag ID in an advertised per-EVI Ethernet A-D route must either be unique across all autonomous systems or an autonomous system border router ("ASBR") needs to perform a translation when the per-EVI Ethernet A-D route is re-advertised by the ASBR from one autonomous system to another.

It will be assumed for the sake of example that EVPN route used to set up the circuit is Route Type 1 (RT-1) (Ethernet A-D per-EVI route). In one embodiment, PE node PE1 advertises route RT-1={RD, ESI, E-TAG, Label}=RD1, ABC, 50, 16001 and receives route RT-1 from PE nodes PE2, PE3 and PE4. In particular, PE node PE1 receives route RT1=RD2, ABC, 50, 16002 from PE node PE2; route RT1=RD3, DEF, 50, 16003 from PE node PE3; and route RT1=RD4, DEF, 50, 16004 from PE node PE4. Using the received route RT-1 information, route resolution is performed at PE node PE1 and the circuit is established between PE nodes PE1/PE2 (since they share the same ESI) and PE nodes PE3/PE4.

All traffic coming from CE node CE1 to PE node PE1 is transmitted over the EVPN-VPWS domain 40 using MPLS label 16003 or 16004 (using an Equal Cost MultiPath ("ECMP") routing strategy) to reach the end of the circuit at CE node CE2. At PE nodes PE3 and PE4, a direct lookup is performed on the MPLS label (16003 or 16004) to forward the packet directly to CE node CE2.

Figure 3:
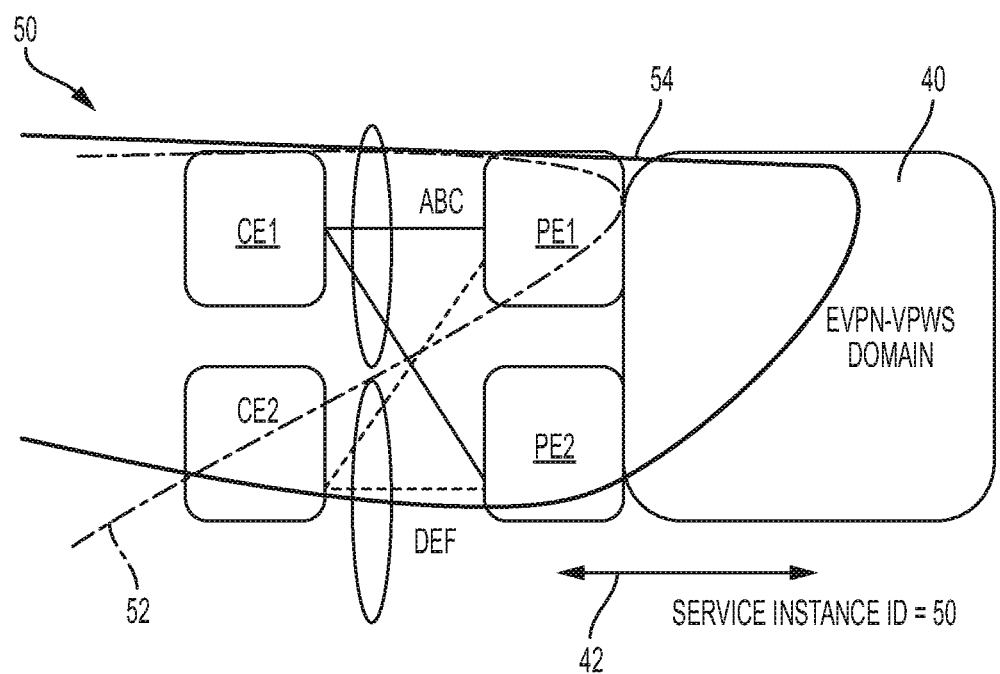
FIG. 3 is another simplified block diagram of the data communications environment including features of embodiments described herein for performing preferred path local switching in EVPN-VPWS.

Referring now to FIG. 3, illustrated therein is a simplified block diagram of a communications system 50, which is similar to the communications system 38 of FIG. 2 except that the PE nodes PE1/PE2 and PE nodes PE3/PE4 are collapsed such that both CE nodes CE1 and CE2 are multihomed to PE nodes PE1 and PE2, with CE1 being connected to PE nodes PE1 and PE2 via ESI ABC and CE2 being connected to PE nodes PE1 and PE2 via ESI DEF. Since the same VPWS service instance exists multiple times on the same PE node, the circuit is built first internally so CE nodes CE1 and CE2 are directly connected via local interfaces (without the need of using a MPLS label). The EVPN-VPWS domain remains in place for protection and as a back-up path. Looking first at PE node PE1, the node advertises RT-1={RD, ESI, E-TAG, Label}=RD1, ABC, 50, 16001 and RD1, DEF, 50, 16011. PE node PE1 receives RT-1 from PE node PE2=RD2, ABC, 50, 16002 and RD2, DEF, 50, 16022. Using the received information, route resolution is performed. PE node PE1 receives service ID 50 reachability via RT-1. However, PE node PE1 knows there is also another local circuit with service ID 50. PE node PE1 then decides that local preference takes precedence over remote information. PE node PE1 establishes a local circuit without going to the EVPN-VPWS domain 40, as illustrated by a path 52. MPLS label lookup is not performed and a simple local switching packet is performed. Traffic flow proceeds from CE node CE1 to PE node PE1 to CE node CE2. Upon a failure between CE node CE2 and PE node PE1, packets transit via the EVPN-VPWS domain 40, as illustrated by a path 54. The auto-sensing of local switching is performed at the PE nodes (in this case, PE node PE1) by matching service instance IDs from different ESIs.

Figure 4:
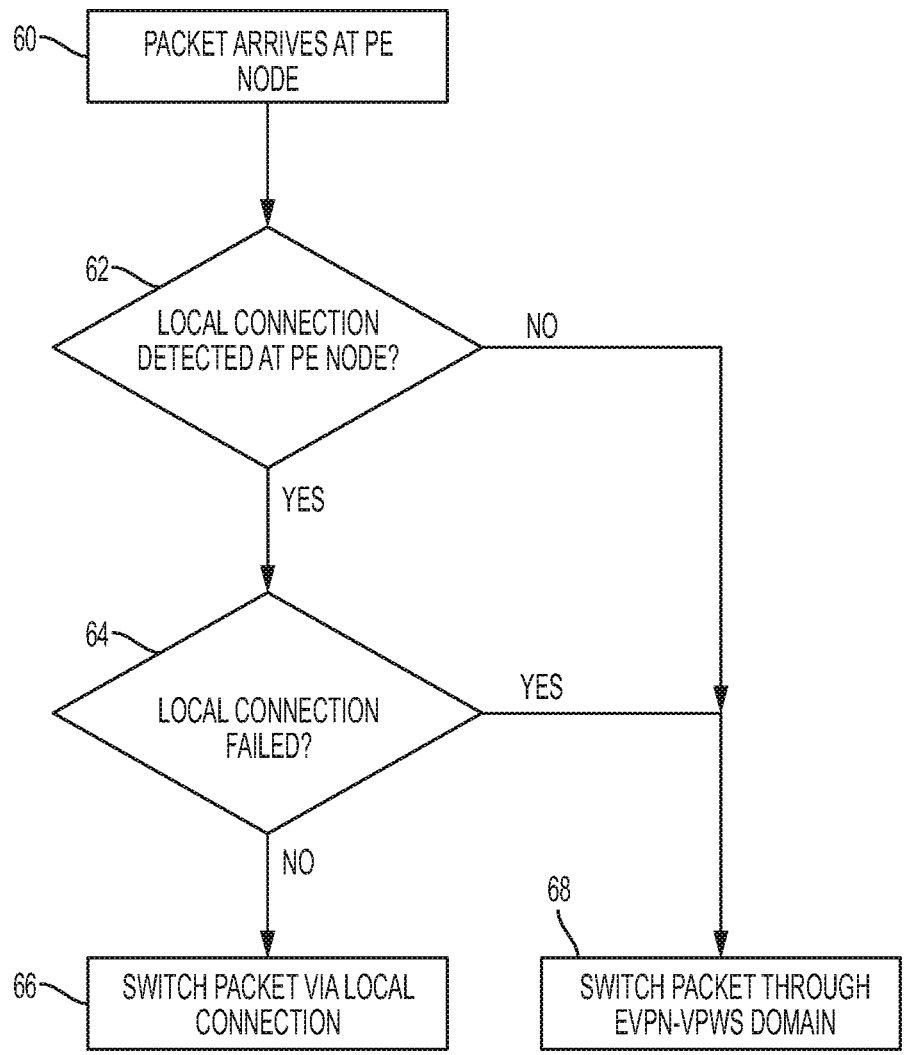
FIG. 4 is a flowchart illustrating steps of a method that may be implemented by a network node of a data communications environment including features of embodiments described herein for performing preferred path local switching in EVPN-VPWS.

FIG. 4 is a flowchart illustrating steps of a method that may be implemented by a network node of a data communications environment including features of embodiments described herein for performing preferred path local switching in EVPN-VPWS. In step 60, a packet from a first CE node destined for a second CE node is received at a PE node. For purposes of illustration, referring to FIG. 3, it will be assumed that a packet is received from CE node CE1 at PE node PE1 destined for CE node CE2. In step 62, a determination is made whether a local connection exists between the PE node and the destination CE node (e.g., between PE node PE1 and CE node CE2). In accordance with features of embodiments described herein, this may be accomplished by the PE node determining that there are multiple connections to the same service ID (e.g., service ID 50) via different ESIs (e.g., ESI ABC and ESI DEF) at the PE node (e.g., PE node PE1). If a positive determination is made in step 62, execution proceeds to step 64, in which a determination is made whether the local connection has failed for some reason. If a negative determination is made in step 64, execution proceeds to step 66, in which the packet is switched through the local connection (e.g., directly from PE node PE1 to CE node CE2). If a positive determination is made in step 64, execution proceeds to step 68, in which the packet is switched through the EVPN-VPWS domain (e.g., EVPN-VPWS domain 40) in a conventional fashion. Similarly, if a negative determination is made in step 62, execution proceeds to step 68.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 5:
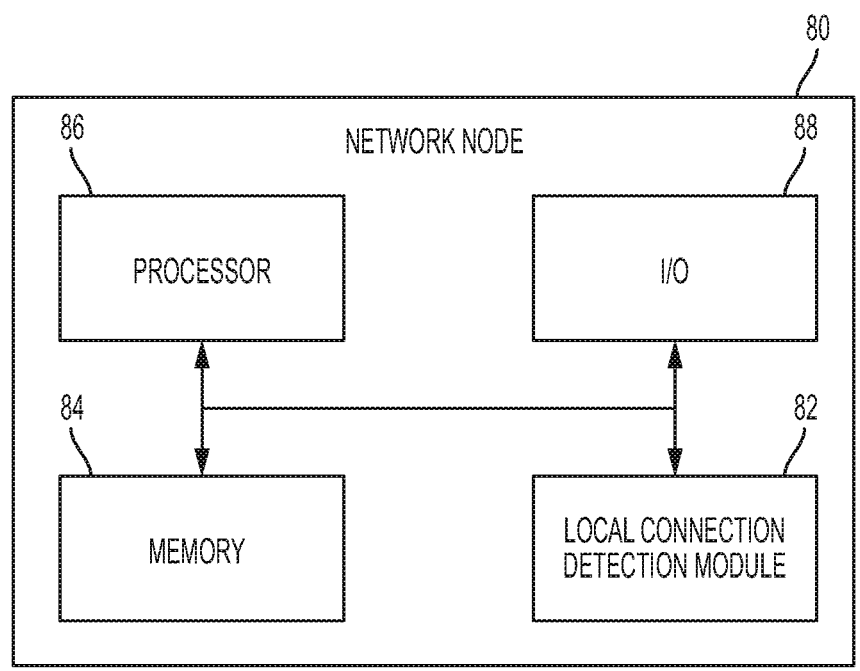
FIG. 5 is a simplified block diagram of a network node of a data communications environment including features of embodiments described herein for performing preferred path local switching in EVPN-VPWS.

For example, referring to FIG. 5, a network node, or element, 80, which may be implemented as a PE node, such as one of PE nodes PE1-PE4, may include a local connection detection ("LCD") module 82 comprising software embodied in one or more tangible media for facilitating the activities described herein. In particular, the module 82 may comprise software for facilitating the processes illustrated in and described with reference to FIG. 6, the node 80 may also include a memory device 84 for storing information to be used in achieving the functions as outlined herein. Additionally, the node 80 may include a processor 86 that is capable of executing software or an algorithm (such as embodied in module 82) to perform the functions as discussed in this Specification. The node 80 may also include various I/O 88 necessary for performing functions described herein. It will be recognized that the node 80 of FIG. 5 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIG. 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Figure 6:
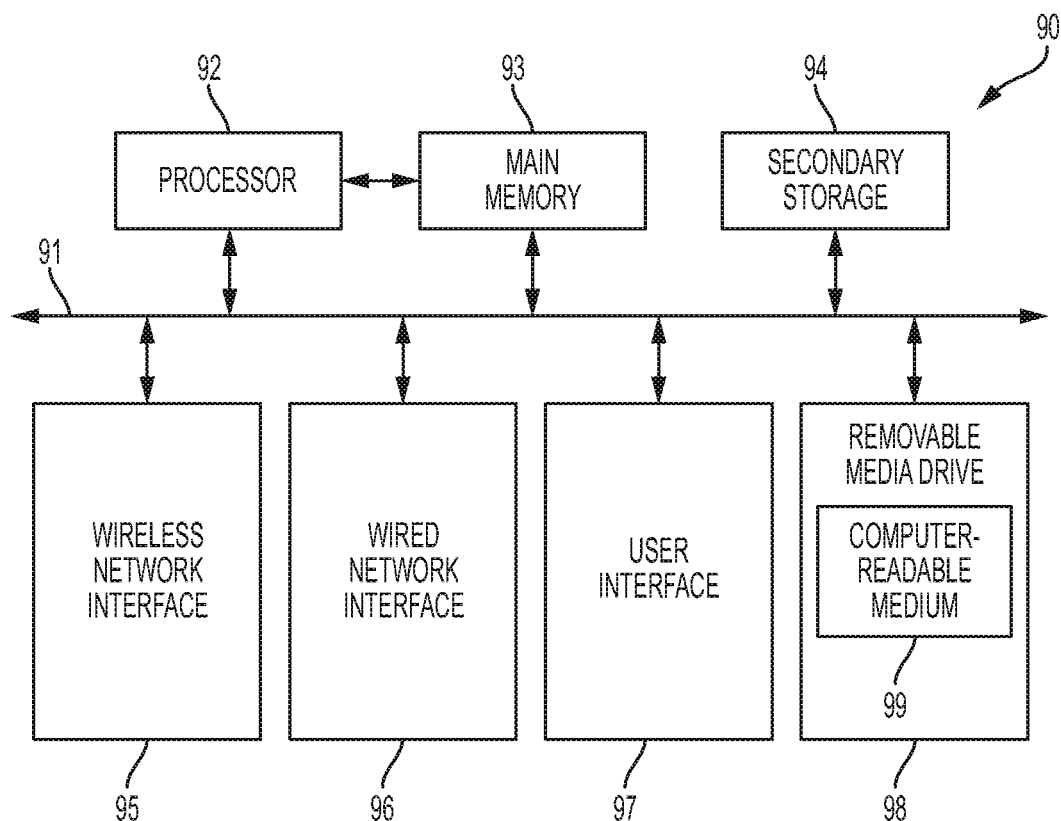
FIG. 6 is a simplified block diagram of a machine comprising a network node of a data communications environment including features of embodiments described herein for performing preferred path local switching in EVPN-VPWS.

Note that in certain example implementations, the functions outlined herein and specifically illustrated in FIG. 6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Turning to FIG. 6, FIG. 6 illustrates a simplified block diagram of an example machine (or apparatus) 90, which in certain embodiments may be a PE node, such as PE nodes P1-P4, that may be implemented in embodiments described herein. The example machine 90 corresponds to network elements and computing devices that may be deployed in a communications network, such as a classifier or a forwarding element. In particular, FIG. 6 illustrates a block diagram representation of an example form of a machine within which software and hardware cause machine 90 to perform any one or more of the activities or operations discussed herein. As shown in FIG. 6, machine 90 may include a processor 92, a main memory 93, secondary storage 94, a wireless network interface 95, a wired network interface 96, a user interface 97, and a removable media drive 98 including a computer-readable medium 99. A bus 91, such as a system bus and a memory bus, may provide electronic communication between processor 92 and the memory, drives, interfaces, and other components of machine 90.

Processor 92, which may also be referred to as a central processing unit ("CPU"), can include any general or special-purpose processor capable of executing machine readable instructions and performing operations on data as instructed by the machine-readable instructions. Main memory 93 may be directly accessible to processor 92 for accessing machine instructions and may be in the form of random access memory ("RAM") or any type of dynamic storage (e.g., dynamic random access memory ("DRAM")). Secondary storage 94 can be any non-volatile memory such as a hard disk, which is capable of storing electronic data including executable software files. Externally stored electronic data may be provided to computer 90 through one or more removable media drives 98, which may be configured to receive any type of external media such as compact discs ("CDs"), digital video discs ("DVDs"), flash drives, external hard drives, etc.

Wireless and wired network interfaces 95 and 96 can be provided to enable electronic communication between machine 90 and other machines, or nodes. In one example, wireless network interface 95 could include a wireless network controller ("WNIC") with suitable transmitting and receiving components, such as transceivers, for wirelessly communicating within a network. Wired network interface 96 can enable machine 90 to physically connect to a network by a wire line such as an Ethernet cable. Both wireless and wired network interfaces 95 and 96 may be configured to facilitate communications using suitable communication protocols such as, for example, Internet Protocol Suite ("TCP/IP"). Machine 90 is shown with both wireless and wired network interfaces 95 and 96 for illustrative purposes only. While one or more wireless and hardwire interfaces may be provided in machine 90, or externally connected to machine 90, only one connection option is needed to enable connection of machine 90 to a network.

A user interface 97 may be provided in some machines to allow a user to interact with the machine 90. User interface 97 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 98 represents a drive configured to receive any type of external computer-readable media (e.g., computer-readable medium 99). Instructions embodying the activities or functions described herein may be stored on one or more external computer-readable media. Additionally, such instructions may also, or alternatively, reside at least partially within a memory element (e.g., in main memory 93 or cache memory of processor 92) of machine 90 during execution, or within a non-volatile memory element (e.g., secondary storage 94) of machine 90. Accordingly, other memory elements of machine 90 also constitute computer-readable media. Thus, "computer-readable medium" is meant to include any medium that is capable of storing instructions for execution by machine 90 that cause the machine to perform any one or more of the activities disclosed herein.

Not shown in FIG. 6 is additional hardware that may be suitably coupled to processor 92 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 90 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 90 to appropriately manage the operation of the hardware components therein.

The elements, shown and/or described with reference to machine 90, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 93, secondary storage 94, computer-readable medium 99) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 92) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    subsequent to receipt of a plurality of packets from a first customer network node destined for a second customer network node at a first provider network node, determining whether a local connection exists between the first provider network node and the second customer network node based on determining whether there are multiple connections to a same service instance identifier via different Ethernet segment identifiers at the first provider network node, wherein the first provider network node comprises part of an Ethernet Virtual Private Network ("EVPN")—Virtual Private Wire Service ("VPWS") domain;

if a local connection is determined to exist between the first provider network node and the second customer network node, determining whether the local connection has failed;

if the local connection is determined not to have failed, switching the plurality of packets to the second customer network node to provide preferred path local switching via the local connection instead of via the EVPN-VPWS domain; and if the local connection is determined to have failed, switching the plurality of packets to the second customer network node via the EVPN-VPWS domain.

2. The method of claim 1, wherein both of the first provider network node and a second provider network node provide all-active redundancy for a redundancy group in which both of the first provider network node and the second provider network node of the redundancy group can forward traffic for both of the first customer network node and the second customer network node.

3. The method of claim 1, further comprising, if a local connection is determined not to exist between the first provider network node and the second customer network node, switching the plurality of packets to the second customer network node via the EVPN-VPWS domain.

4. The method of claim 1, wherein the first customer network node is locally connected to the first provider network node.

5. The method of claim 1, wherein the first and second customer network nodes comprise customer edge ("CE") nodes.

6. The method of claim 1, wherein the first provider network node comprises a provider edge ("PE") node.

7. The method of claim 1, further comprising establishing a circuit between the first provider network node and a second provider network node via the EVPN-VPWS domain.

8. The method of claim 7, wherein the second customer network node is locally connected to the second provider network node.

9. The method of claim 1, wherein the first customer network node is associated with a first Ethernet segment identifier and the second customer network node is associated with a second Ethernet segment identifier that is different from the first Ethernet segment identifier.

10. One or more non-transitory tangible media that includes code for execution and when executed by a processor is operable to perform operations comprising:

subsequent to receipt of a plurality of packets from a first customer network node destined for a second customer network node at a first provider network node, determining whether a local connection exists between the first provider network node and the second customer network node based on determining whether there are multiple connections to a same service instance identifier via different Ethernet segment identifiers at the first provider network node, wherein the first provider network node comprises part of an Ethernet Virtual Private Network ("EVPN") —Virtual Private Wire Service ("VPWS") domain;

if a local connection is determined to exist between the first provider network node and the second customer network node, determining whether the local connection has failed;

if the local connection is determined not to have failed, switching the plurality of packets to the second customer network node to provide preferred path local switching via the local connection instead of via the EVPN-VPWS domain; and if the local connection is determined to have failed, switching the plurality of packets to the second customer network node via the EVPN-VPWS domain.

11. The media of claim 10, wherein both of the first provider network node and a second provider network node provide all-active redundancy for a redundancy group in which both of the first provider network node and the second provider network node of the redundancy group can forward traffic for both of the first customer network node and the second customer network node.

12. The media of claim 10, wherein the operations further comprise, if a local connection is determined not to exist between the first provider network node and the second customer network node, switching the plurality of packets to the second customer network node via the EVPN-VPWS domain.

13. The media of claim 10, wherein the first customer network node is locally connected to the first provider network node.

14. The media of claim 10, wherein the first and second customer network nodes comprise customer edge ("CE") nodes.

15. The media of claim 10, wherein the first provider network node comprises a provider edge ("PE") node.

16. The media of claim 10, wherein the operations further comprise establishing a circuit between the first provider network node and a second provider network node via the EVPN-VPWS domain.

17. The media of claim 16, wherein the second customer network node is locally connected to the second provider network node.

18. An apparatus comprising:

a memory element configured to store data; and a processor operable to execute instructions associated with the data, wherein executing the instructions causes the apparatus to perform operations, comprising:

subsequent to receipt of a plurality of packets from a first customer network node destined for a second customer network node at a first provider network node, determining whether a local connection exists between the first provider network node and the second customer network node based on determining whether there are multiple connections to a same service instance identifier via different Ethernet segment identifiers at the first provider network node, wherein the first provider network node comprises part of an Ethernet Virtual Private Network ("EVPN")—Virtual Private Wire Service ("VPWS") domain;

if a local connection is determined to exist between the first provider network node and the second customer network node, determining whether the local connection has failed;

if the local connection is determined not to have failed, switching the plurality of packets to the second customer network node to provide preferred path local switching via the local connection instead of via the EVPN-VPWS domain; and if the local connection is determined to have failed, switching the plurality of packets to the second customer network node via the EVPN-VPWS domain.

19. The apparatus of claim 18, wherein both of the first provider network node and a second provider network node provide all-active redundancy for a redundancy group in which both of the first provider network node and the second provider network node of the redundancy group can forward traffic for both of the first customer network node and the second customer network node.

20. The apparatus of claim 18, wherein executing the instructions causes the apparatus to perform further operations, comprising:
if a local connection is determined not to exist between the first provider network node and the second customer network node, switching the plurality of packets to the second customer network node via the EVPN-VPWS domain.

\* \* \* \* \*